(12) United States Patent
Qiu

(10) Patent No.: US 12,390,058 B2
(45) Date of Patent: Aug. 19, 2025

(54) PAPER TOWEL HOLDER

(71) Applicant: Wenzhou Furuisi Building Materials Co., Ltd, Zhejiang (CN)

(72) Inventor: Chunhe Qiu, Zhejiang (CN)

(73) Assignee: Wenzhou Furuisi Building Materials Co., Ltd, Wenzhou (CN)

( * ) Notice: Subject to any disclaimer, the term of this patent is extended or adjusted under 35 U.S.C. 154(b) by 193 days.

(21) Appl. No.: 18/221,903

(22) Filed: Jul. 14, 2023

(65) Prior Publication Data

US 2025/0000312 A1   Jan. 2, 2025

(30) Foreign Application Priority Data

Jun. 28, 2023   (CN) .......................... 202321676508.4

(51) Int. Cl.
*A47K 10/38*   (2006.01)

(52) U.S. Cl.
CPC ................................. *A47K 10/38* (2013.01)

(58) Field of Classification Search
CPC ................................................... A47K 10/405
See application file for complete search history.

(56) References Cited

U.S. PATENT DOCUMENTS

| | | | | |
|---|---|---|---|---|
| 1,156,266 A * | 10/1915 | Bens et al. ............. | B65H 16/06 |
| | | | 242/598.2 |
| 1,322,524 A * | 11/1919 | Bovee ..................... | A47K 10/38 |
| | | | 242/599.3 |
| 1,778,856 A * | 10/1930 | Hoegger ................. | A47K 10/22 |
| | | | 242/598.2 |
| 1,889,024 A * | 11/1932 | Marsh ..................... | A47K 10/38 |
| | | | 242/598.1 |
| 2,517,809 A * | 8/1950 | Tarzian ................... | A47K 10/38 |
| | | | 242/598.2 |
| 4,416,425 A * | 11/1983 | Kish ....................... | A47K 10/38 |
| | | | 211/171 |
| 4,824,038 A * | 4/1989 | Chandler ............ | A47K 10/3836 |
| | | | 242/598.5 |
| 5,718,396 A * | 2/1998 | Maresca .............. | A47K 10/405 |
| | | | 242/598.2 |
| 5,868,344 A * | 2/1999 | Melnick ............. | A47K 10/3836 |
| | | | 242/598.2 |
| 5,913,491 A * | 6/1999 | Bulla .................. | A47K 10/3836 |
| | | | 242/597 |
| 6,007,019 A * | 12/1999 | Lynch ................ | A47K 10/3836 |
| | | | 242/598.5 |

(Continued)

*Primary Examiner* — William A. Rivera

(57) ABSTRACT

A paper towel holder is provided and includes: a first support assembly, comprising a first mounting base and a first support member, wherein the first support member is rotatably connected to the first mounting base and is configured to support a to-be-hung object; a second support assembly, disposed on a side of the first support assembly, wherein the second support assembly comprises a second mounting base and a second support member, and the second support member is connected to the second mounting base; a first connection assembly; and a second connection assembly. One of the first support member and the second support member is connected to the first connection assembly, and the other one of the first support member and the second support member is connected to the second connection assembly.

20 Claims, 13 Drawing Sheets

(56) References Cited

U.S. PATENT DOCUMENTS

| | | | | |
|---|---|---|---|---|
| 7,762,493 B2* | 7/2010 | Berberet | ............... | A47K 10/405 |
| | | | | 242/598.5 |
| 2006/0261211 A1* | 11/2006 | Hass | .................... | A47K 10/405 |
| | | | | 242/598.1 |
| 2007/0267534 A1* | 11/2007 | Burnett | ................ | A47K 10/405 |
| | | | | 242/598.2 |
| 2009/0242713 A1* | 10/2009 | Lowe | ..................... | A47K 10/38 |
| | | | | 248/222.13 |
| 2012/0205486 A1* | 8/2012 | Edmonds | ............. | B65H 16/005 |
| | | | | 242/598.2 |
| 2024/0148197 A1* | 5/2024 | Malinski | ................ | A47K 10/22 |

\* cited by examiner

PAPER TOWEL HOLDER

CROSS REFERENCE TO RELATED APPLICATIONS

The present disclosure claims the priority of Chinese patent application No. 202321676508.4 filed on Jun. 28, 2023, and contents of which are incorporated herein in its entireties.

TECHNICAL FIELD

The present disclosure relates to the field of paper towel holders, and in particular to a paper towel holder.

BACKGROUND

As science and technology develop, paper towel holders are used in people's daily lives for hanging objects to be hung. In the art, a paper towel holder is arranged with a protruding tab. The protruding tab is disposed horizontally. The paper towel sleeves the protruding tab. However, an end of the protruding tab is a free end, connected to an external environment. When the paper towel sleeves the protruding tab, the paper towel may easily be detached away from the protruding tab from the free end of the protruding tab. Therefore, the paper towel may easily be detached from the paper towel holder in the art.

SUMMARY OF THE DISCLOSURE

The present disclosure provides a paper towel holder to solve the problem as described in the above.

According to the present disclosure, following technical solutions are provided.

A paper towel holder is provided and includes following components.

A first support assembly includes: a first mounting base and a first support member, wherein the first support member is rotatably connected to the first mounting base.

A second support assembly is disposed on a side of the first support assembly. The second support assembly includes a second mounting base and a second support member, and the second support member is connected to the second mounting base.

One of the first support member and the second support member is connected to the first connection assembly, and the other one of the first support member and the second support member is connected to the second connection assembly. When the first support member and the second support member are approaching or moving away from each other, the first connection assembly is detachably connected to the second connection assembly. The first support member is configured to support a to-be-hung object.

According to the paper towel holder provided in the present disclosure, when the first support member and the second support member are approaching each other, the first connection assembly is detachably connected to the second connection assembly. The first support member is configured to support the to-be-hung object. When the first connection assembly is detached from the second connection assembly, the first support member is disposed at the outside of the second support member. The to-be-hung object is placed to sleeve the first support member, such that the first support member may support the to-be-hung object. In this way, the object may be taken out of the first support member easily. In addition, the first support member rotates with respect to the first mounting base to gradually approach the second support member, such that the first connection assembly is connected to the second connection assembly. The connection between the first connection assembly and the second connection assembly prevents the to-be-hung object from being detached away from the paper towel holder, ensuring the paper towel holder to hang the to-be-hung object stably. Further, the object may be taken out of the frame easily by switching the connection status between the first connection assembly and the second connection assembly.

BRIEF DESCRIPTION OF THE DRAWINGS

In order to illustrate the technical solutions in the embodiments of the present disclosure more clearly, the accompanying drawings for describing the embodiments will be described briefly in the following. Apparently, the accompanying drawings in the following description show only some embodiments of the present disclosure, and any ordinary skilled person in the art may obtain other accompanying drawings based on the following drawings without creative work.

In order to understand the present disclosure more completely and beneficial effects, the present disclosure will be described by referring to the accompanying drawings. The same reference numeral in the following description indicates the same element.

DETAILED DESCRIPTION

Figure 1:
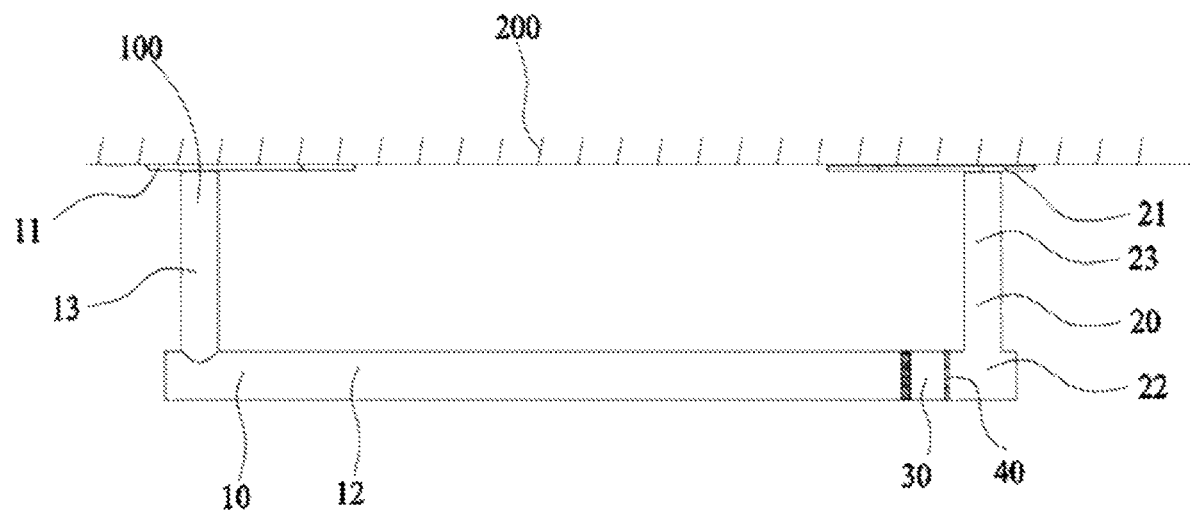
FIG. 1 is a schematic view of a paper towel holder placed horizontally according to a first embodiment of the present disclosure.
Figure 2:
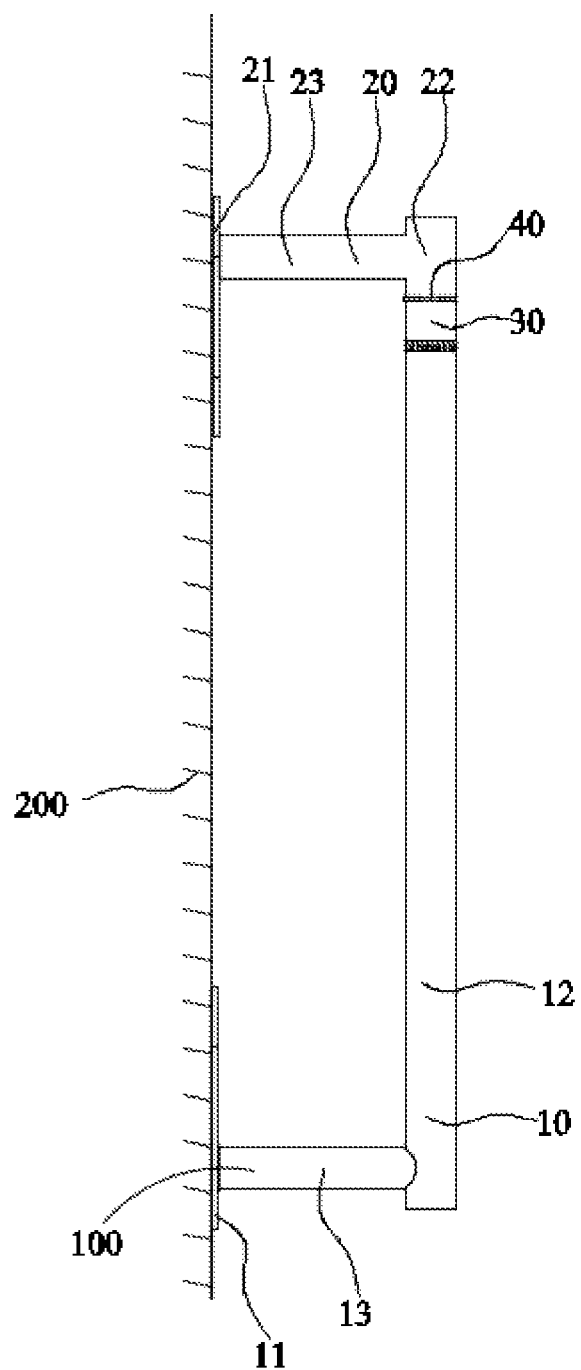
FIG. 2 is a schematic view of the paper towel holder placed vertically according to the first embodiment of the present disclosure.
Figure 3:
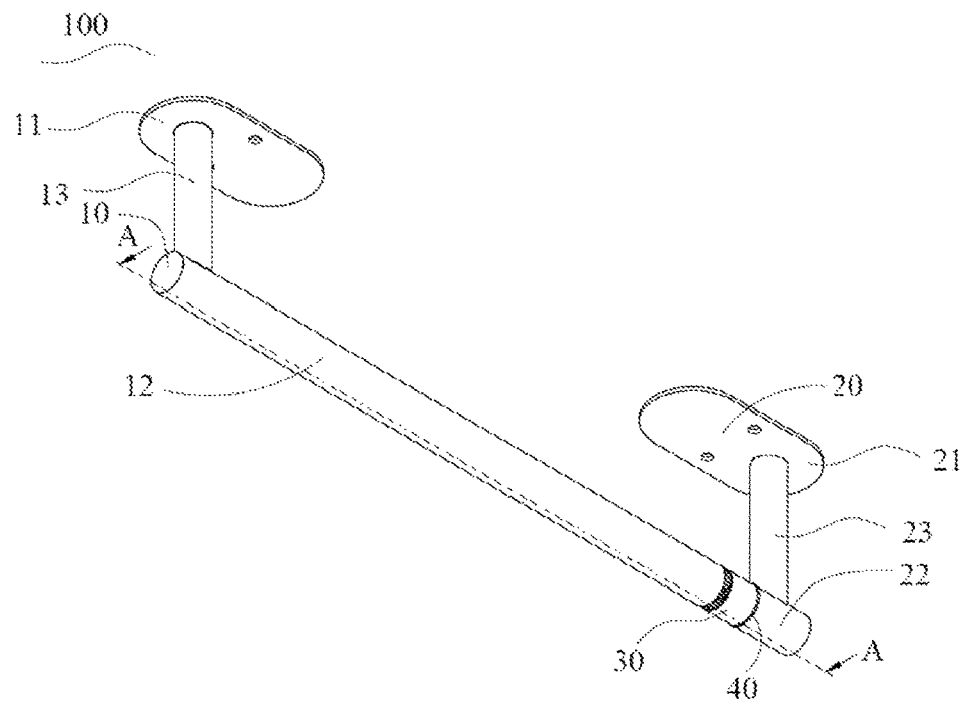
FIG. 3 is a perspective view of the assembled paper towel holder according to the first embodiment of the present disclosure.

The technical solutions in the embodiments of the present disclosure will be clearly and completely described below by referring to the accompanying drawings in the embodiments of the present disclosure. Obviously, the described embodiments are only a part of, but not all of, the embodiments of the present disclosure. All other embodiments obtained by any ordinary skilled person in the art based on the embodiments of the present disclosure, without creative work, shall fall within the scope of the present disclosure.

First Embodiment

As shown in FIG. 1 to FIG. 16, the present disclosure provides a paper towel holder 100, configured to hold a paper towel. It can be understood that, the paper towel holder can be used to support other to-be-hung object, and the present disclosure does not limit the to-be-hung object. In some embodiments, the paper towel holder 100 is configured to hang a towel ring.

The paper towel holder 100 includes a first support assembly 10, a second support assembly 20, a first connection assembly 30, and a second connection assembly 40. The first support assembly 10 is arranged opposite to the second support assembly 20. The first support assembly 10 and the second support assembly 20 are mounted on a mounting surface 200. The mounting surface 200 may be a surface of a wall, a surface of a platform, or a surface of a box, which will not be limited herein. In some embodiments, one of the first connection assembly 30 and the second connection assembly 40 may be mounted on the first support assembly 10, and the other of the first connection assembly 30 and the second connection assembly 40 may be mounted on the second support assembly 20 correspondingly.

As shown in FIG. 1 to FIG. 4, the first support assembly 10 includes a first mounting base 11 and a first support member 12. The first mounting base 11 is configured to be mounted on the mounting surface 200. The first support assembly 10 is disposed opposite to the second support assembly 20. The first mounting base 11 and the second mounting base 21 may be arranged in a horizontal direction or in a vertical direction, depending on usage requirements.

The first support member 12 is rotatably connected to the first mounting base 11. The first support member 12 is disposed at a side of the first mounting base 11 and rotates along an axis of a connection between the first support member 12 and the first mounting base 11. In this way, a position of the first support member 12 may be adjusted easily, enabling the user to place the to-be-hung object to sleeve the first support member 12 or to remove the object away from the first support member 12. In some embodiments, the first support member 12 may be in a shape of a round rod, a flat plate, a prism, a square and so on, which will not be limited herein.

The first support assembly 10 further includes a first connection arm 13. The first connection arm 13 is disposed between the first mounting base 11 and the first support member 12. An end of the first connection arm 13 is rotatably connected to the first mounting base 11, and the other end of the first connection arm 13 is connected to the first support member 12. The first connection arm 13 rotates relative to the first mounting base 11, and the first support member 12 rotates as the first connection arm 13 is rotating, such that the first support member 12 rotates relative to the first mounting base 11, and therefore, the position of the first support member 12 may be adjusted easily. In some embodiments, the first connection arm 13 and the first support member 12 may be two elements independent from each other, and the first connection arm 13 is fixedly connected to the first support member 12. In some embodiments, the first connection arm 13 and the first support member 12 may be configured as a one-piece and integral structure.

Figure 4:
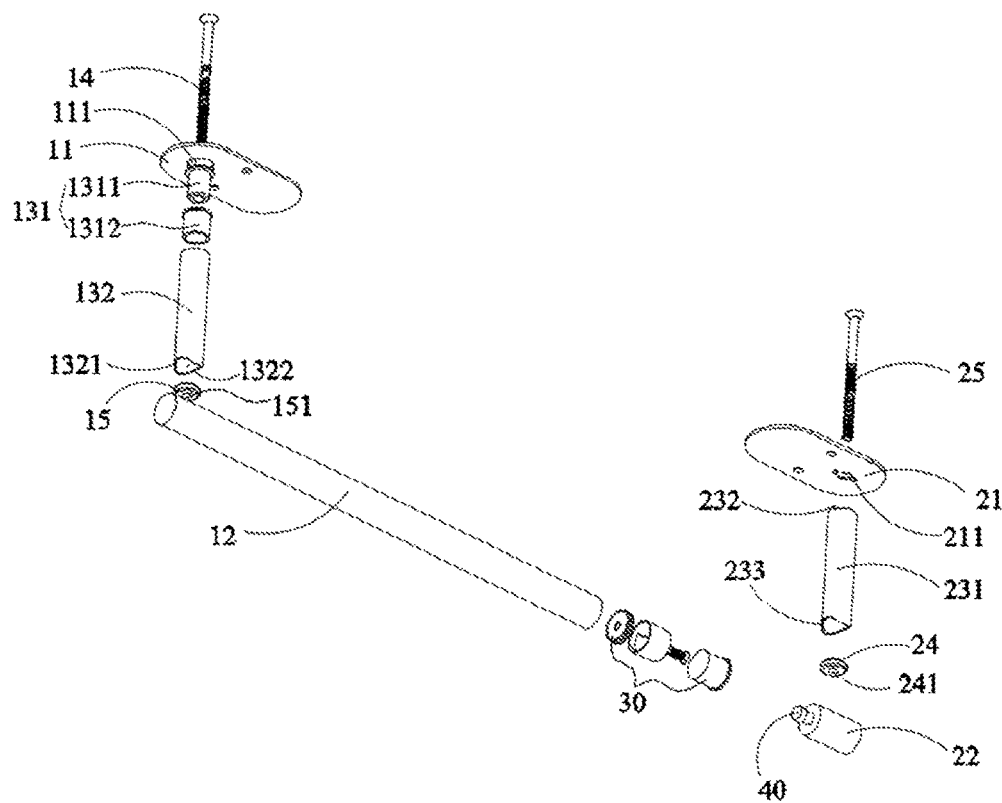
FIG. 4 is an explosive view of the paper towel holder according to the first embodiment of the present disclosure.
Figure 5:
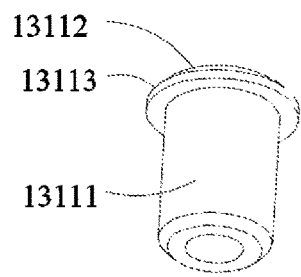
FIG. 5 is a perspective view of a first shaft sleeve of the paper towel holder according to the first embodiment of the present disclosure.
Figure 6:
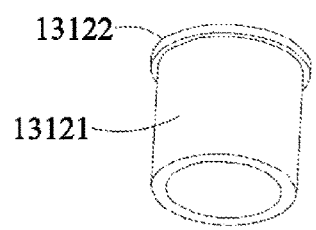
FIG. 6 is a perspective view of a second shaft sleeve of the paper towel holder according to the first embodiment of the present disclosure.

As shown in FIG. 4 to FIG. 6, in an embodiment, the first connection arm 13 includes a first rotation shaft 131 and a second rotation shaft 132. The first rotation shaft 131 is fixedly mounted on the first mounting base 1111. The second rotation shaft 132 sleeves the first rotation shaft 131 and is disposed at an outside of the first rotation shaft 131. The second rotation shaft 132 may rotate relative to the first rotation shaft 131. The second rotation shaft 132 is disposed between the first mounting base 11 and the first support member 12. An end of the second rotation shaft 132 contacts a surface of the first mounting base 11, and the other end of the second rotation shaft 132 contacts a surface of the first support member 12. The two ends of the second rotation shaft 132 are clamped by the surface of the first mounting base 11 and the surface of the first support member 12, such that the second rotation shaft 132 is prevented from being detached from the first mounting base 11 and the first support member 12.

Figure 7:
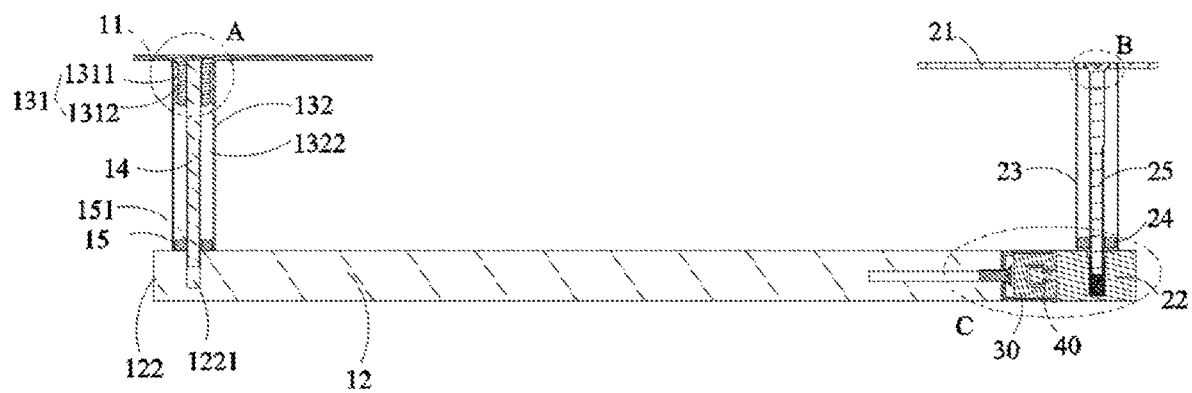
FIG. 7 is a cross sectional view of the paper towel holder shown in FIG. 3, taken along the line I-I.
Figure 8:
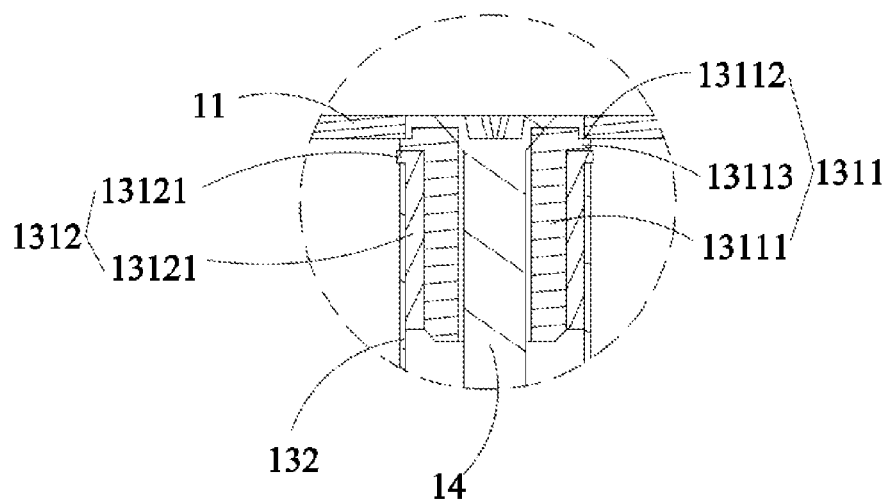
FIG. 8 is an enlarged view of the portion A shown in FIG. 7.
Figure 9:
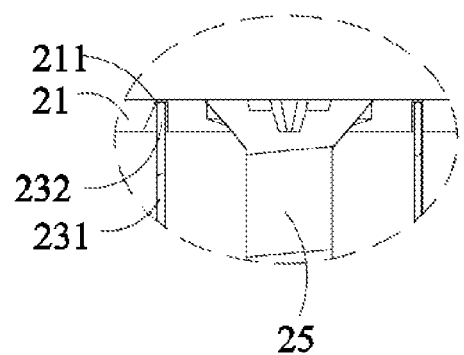
FIG. 9 is an enlarged view of the portion B shown in FIG. 7.
Figure 12:
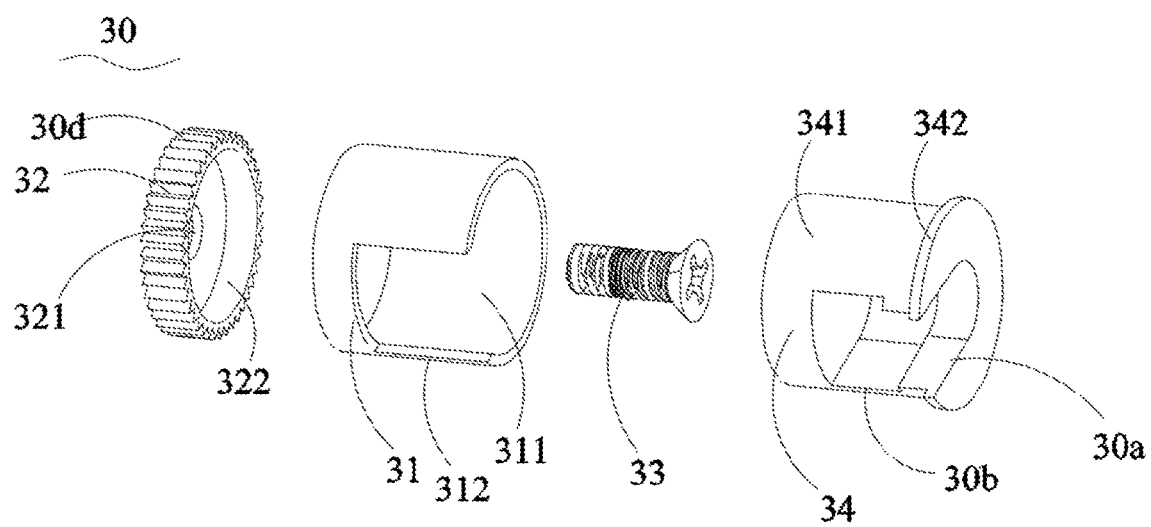
FIG. 12 is an explosive view of a first connection assembly of the paper towel holder according to the first embodiment of the present disclosure.
Figure 13:
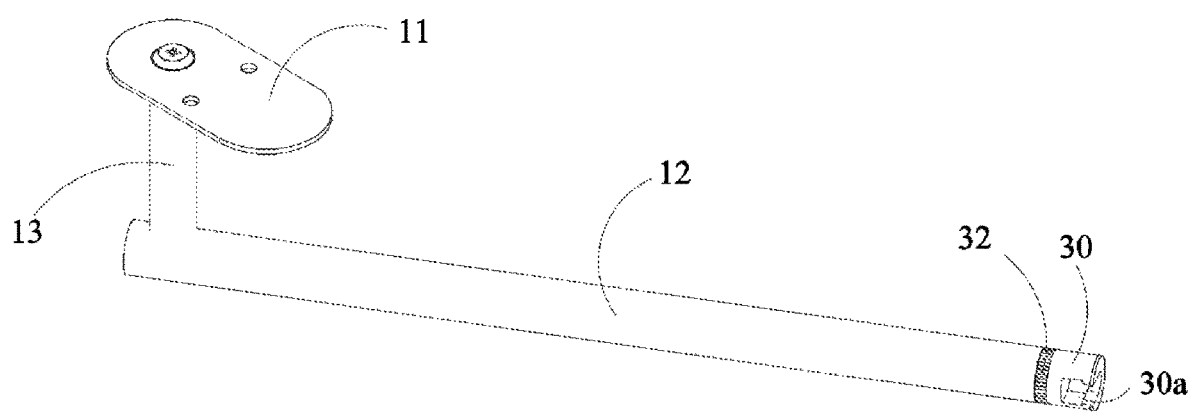
FIG. 13 is a perspective view of a part of the assembled paper towel holder according to the first embodiment of the present disclosure.
Figure 14:
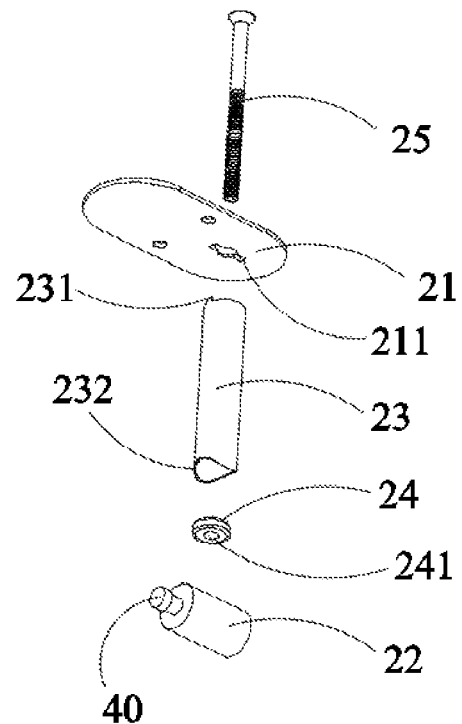
FIG. 14 is an explosive view of a second support assembly of the paper towel holder according to the first embodiment of the present disclosure.

As shown in FIG. 7, FIG. 8, and FIG. 12, the first rotation shaft 131 includes a first shaft sleeve 1311 and a second shaft sleeve 1312. The first shaft sleeve 1311 is tubular and is substantially hollow. The first shaft sleeve 1311 includes a first body 13111, a first connection portion 13112, and a first flange 13113. The first connection portion 13112 and a first flange 13113 are formed at an end of the first body 13111. The first connection portion 13112 is received in a first via 111 of the first mounting base 11 and is fixedly connected to the first mounting base 11 by welding. The first flange 13113 is formed at an outer periphery of a connection between the first connection portion 13112 and the first body 13111 and abuts against the surface of the first mounting base 11 facing towards the first support member 12.

The second shaft sleeve 1312 is tubular and is substantially hollow. The second shaft sleeve 1312 includes a second body 13121 and a second flange 13122 formed at an end of the second body 13121. The second shaft sleeve 1312 rotatably sleeves the first body 13111 of the first shaft sleeve 1311. The second flange 13122 of the second shaft sleeve 1312 is aligned with the first flange 13113 of the first shaft sleeve 1311. Alternatively, the second flange 13122 of the second shaft sleeve 1312 covers the first flange 13113 of the first shaft sleeve 1311. In some embodiments, the first sleeve 1311 is made of metal and is welded to the first mounting base 11, and the second sleeve 1312 is made of plastic.

As shown in FIG. 7 to FIG. 11, the first support member 12 includes a support portion 121, a first end portion 122, and a second end portion 123. The support portion 121 may be a hollow tube or a solid column. The first end portion 122 is formed by extending from an end of the support portion 121, and the second end portion 123 is formed by extending from the other end of the support portion 121. A side of the first end portion 122 facing towards the first mounting base 11 defines a threaded hole 1221. The threaded hole 1221 extends towards an interior of the first end portion 122 along a radial direction. The first support assembly 10 further includes a first threaded member 14. An end of the first threaded member 14 passes through the first rotation shaft 131 and the second rotation shaft 132. A nut end of the first threaded member 14 contacts an end face of the first connection portion 13112 of the first rotation shaft 131. A threaded end of first threaded member 14 is threadly received into a threaded hole 1221. In this way, the first threaded member 14 is connected the first mounting base 11, the first connection arm 13, and the first support member 12 in an axially direction. It will be understood that the support portion 121, the first end portion 122, and the second end portion 123 may be configured as a one-piece and integral structure; or the support portion 121, the first end portion 122, and the second end portion 123 may be configured as three separated structures and are fixedly connected with each other.

The second rotation shaft 132 positions and is connected to the first support member 12. Since the second rotation shaft 132 and the first support member 12 are positioned and connected with each other, installation accuracy between the second rotation shaft 132 and the first support member 12 may be improved. In this case, the end of the second rotation shaft 132 facing towards the first support member 12 is arranged with a first arc portion 1321. The first support member 12 is embedded in the first arc portion 1321. A circumferential wall of the first support member 12 is restricted by an inner wall of the first arc portion 1321, preventing the first support member 12 from rotating relative to the second rotation shaft 132. In this way, the first support member 12 and the second rotation shaft 132 may rotate synchronously, and the first support member 12 and the second rotation shaft 132 rotate simultaneously relative to the first mounting base 11.

In addition, the second rotation shaft 132 defines a first inner cavity 1322. The first threaded member 14 extends through the first inner cavity 1322. A first limiting member 15 is arranged inside the second rotation shaft 132. The first limiting member 15 is received in the first inner cavity 1322 and is connected to the end of the second rotation shaft 132 facing towards the first support member 12. In some embodiments, the first limiting member 15 is interference fit with or welded to the second rotation shaft 132. While the first threaded member 14 extends through the second rotation shaft 132, the first threaded member 14 extends into the first inner cavity 1322 along an axis of the second rotation shaft 132. In addition, the first threaded member 14 extends through the first limiting member 15 and is limited by the first limiting member 15, such that a position of the first threaded member 14 in the radial direction may be limited.

Further, since the first threaded member 14 extends through the first limiting member 15, the first limiting member 15 is prevented from interfering the first threaded member 14, and positions of the first threaded member 14 and the second rotation shaft 132 may be limited to some extent. In some embodiments, the first limiting member 15 may be a circular rotation shaft and defines a first through hole 151. The first threaded member 14 extends through the first through hole 151. A gap is defined between a circumferential wall of the first threaded member 14 and an inner wall of the first limiting member 15 defining the first through hole 151, i.e., a wall of the first through hole 151. In this way, the inner wall of the first limiting member 15 defining the first through hole 151 may limit the circumferential wall of the first threaded member 14.

When the first support member 12 is rotating, the second rotation shaft 132 rotates accordingly. The second rotation shaft 132 is fixed with the second shaft sleeve 1312, while the second shaft sleeve 1312 may be rotated relative to the first shaft sleeve 1311. Alternatively, the second shaft sleeve 1312 is fixed to the first shaft sleeve 1311, while the second rotation shaft 132 may be rotated relative to the second shaft sleeve 1312 and the first shaft sleeve 1311. The second shaft sleeve 1312 allows the first support member 12 to rotate more smoothly.

The second support assembly 20 includes a second mounting base 21, a second support member 22, and a second connection arm 23. The second support member 22 is connected to the second mounting base 21. The second mounting base 21 serves as a supporting element of the first support assembly 10 and is mounted on the mounting surface 200. The second mounting base 21 is substantially flat. The second mounting base 21 defines a positioning hole 211. The second support member 22 is substantially cylindrical. The second support member 22 is disposed at a side of the second mounting base 21 and is connected to the second mounting base 21 by the second connection arm 23. The second support member 22 serves as a supporting element of the second support assembly 20 and is connected to the first connection assembly 30 or the second connection assembly 40.

The second connection arm 23 is disposed between the second mounting base 21 and the second support member 22. An end of the second connection arm 23 is fixedly connected to the second mounting base 21, and the other end of the second connection arm 23 is fixedly connected to the second support member 22. The end of the second connection arm 23 is fixed to the second mounting base 21, and the second connection arm 23 is fixed relative to the second mounting base 21. The second support member 22 is fixed to the second mounting base 21 by the second connection arm 23. In this way, the second support member 22 is ensured to be arranged at its position. In some embodiments, the second connection arm 23 and the second support member 22 may be two independent components and may be fixedly connected to each other by screwing, welding, gluing, and so on. The second connection arm 23 and the first support member 12 may alternatively be configured as a one-piece and integral structure.

The second connection arm 23 includes an extension portion 231, a protruding tab 232, and a second arc portion 233. The protruding tab 232 is formed at an end of the extension portion 231. The second arc portion 233 is formed at the other end of the extension portion 231. The extension portion 231 is tubular and is substantially hollow. The extension portion 231 is connected to the positioning hole 211 of the second mounting base 21 through the protruding tab 232. The extension portion 231 acts on the second support member 22 through the second arc portion 233.

The protruding tab 232 is disposed at an upper end of the extension portion 231 and is substantially square. The protruding tab 232 is inserted in the positioning hole 211. The protruding tab 231 is restricted by an inner wall of the second mounting base 21 defining the positioning hole 211, preventing the second connection arm 23 from rotating relative to the second mounting base 21, such that mounting accuracy between the second connection arm 23 and the second mounting base 21 is ensured. In some embodiments, a plurality of protruding tabs 232 may be arranged. The plurality of protruding tabs 232 are spaced apart from each other and distributed along a circumference of the extension portion 231. Alternatively, plurality of protruding tabs 232 are distributed symmetrically along the circumference of the extension portion 231.

The second arc portion 233 is disposed at a lower end of the extension portion 231. In some embodiments, the second arc portion 233 may be an arc-shaped groove. The second support member 22 is embedded in the second arc portion 233. The second arc portion 233 is connected to and positions the second support member 22. A circumferential wall of the second support member 22 is limited by an inner wall of the second arc portion 233, preventing the second support member 22 from rotating relative to the second connection arm 23 and ensuring the second support member 22 to be fixedly connected to the second mounting base 21. In this way, the second support member 22 is maintained at rest, enabling the first support member 12 to move to approach or move away from the second support member 22.

In some embodiments, a length of the first support member 12 is greater than a length of the second support member 22, and the first support member 12 is substantially configured to support the to-be-hung object.

In addition, the second support assembly 20 further includes a second limiting member 24 and a second threaded member 25. The second threaded member 25 extends through the second connection arm 23 and is connected to the second support member 22. A second limiting member 24 is arranged inside the second connection arm 23. The second limiting member 24 defines a second through hole 241. The second threaded member 25 extends through the second through hole 241.

The extension portion 231 defines a second inner cavity 2311. The second threaded member 25 extends through the second inner cavity 2311. The second limiting member 24 is arranged inside the extension portion 231 and is received in the second inner cavity 2311. Further, the second limiting member 24 is connected to an end of the extension portion 231 facing towards the second support member 22. In some embodiments, the second limiting member 24 is interference fit or welded to the extension portion 231. When the second threaded member 25 extends through the extension portion 231, the second threaded member 25 extends into the second inner cavity 2311 along the axis of the extension portion 231. Further, the second threaded member 25 extends through the second limiting member 24 and is limited by the second limiting member 24. In this way, the second threaded member 25 may be limited in the radial direction.

In another embodiment, the second connection arm 23 is rotatably connected to the second mounting base 21 and drives the second support member 22 to rotate along the axis of the second connection arm 23. In this way, rotation of the second support member 22 may be achieved, improving versatility of the paper towel holder 100.

One of the first support member 12 and the second support member 22 is connected with the first connection assembly 30, and the other one of the first support member 12 and the second support member 22 is connected with the second connection assembly 40. When the first support member 12 and the second support member 22 are approaching each other, the first connection assembly 30 and the second connection assembly 40 are detachably connected with each other. The first support member 12 is configured to support the to-be-hung object. When the first connection assembly 30 is detached from the second connection assembly 40, the first support member 12 is disposed at the outside of the second support member 22. The user may place the to-be-hung object to sleeve or to be hung on the first support member 12 to allow the first support member 12 to support the to-be-hung object. In this way, the object may be taken out of the first support member 12 easily.

Furthermore, the first support member 12 rotates with respect to the first mounting base 11 and gradually approaches the second support member 22, enabling the first connection assembly 30 to be connected to the second connection assembly 40. The connection between the first connection assembly 30 and the second connection assembly 40 prevents the to-be-hung object from being detached away from the first support member 12, ensuring the paper towel holder 100 to hang the to-be-hung object stably. Further, the object may be taken out of the paper towel holder 100 by switching the connection status between the first connection assembly 30 and the second connection assembly 40.

The first connection assembly 30 is arranged at the end of the first support member 12. The second connection assembly 40 is arranged at the end of the second support member 22. The second connection assembly 40 and the first connection assembly 30 may approach or move away from each other. When the first connection assembly 30 is detached from the second connection assembly 40, the first support member 12 is disposed at the outside of the second support member 22. The user may place the to-be-hung object to sleeve the first support member 12, allowing the first support member 12 to support the to-be-hung object, and the object may be taken out of the first support member 12 easily.

Figure 10:
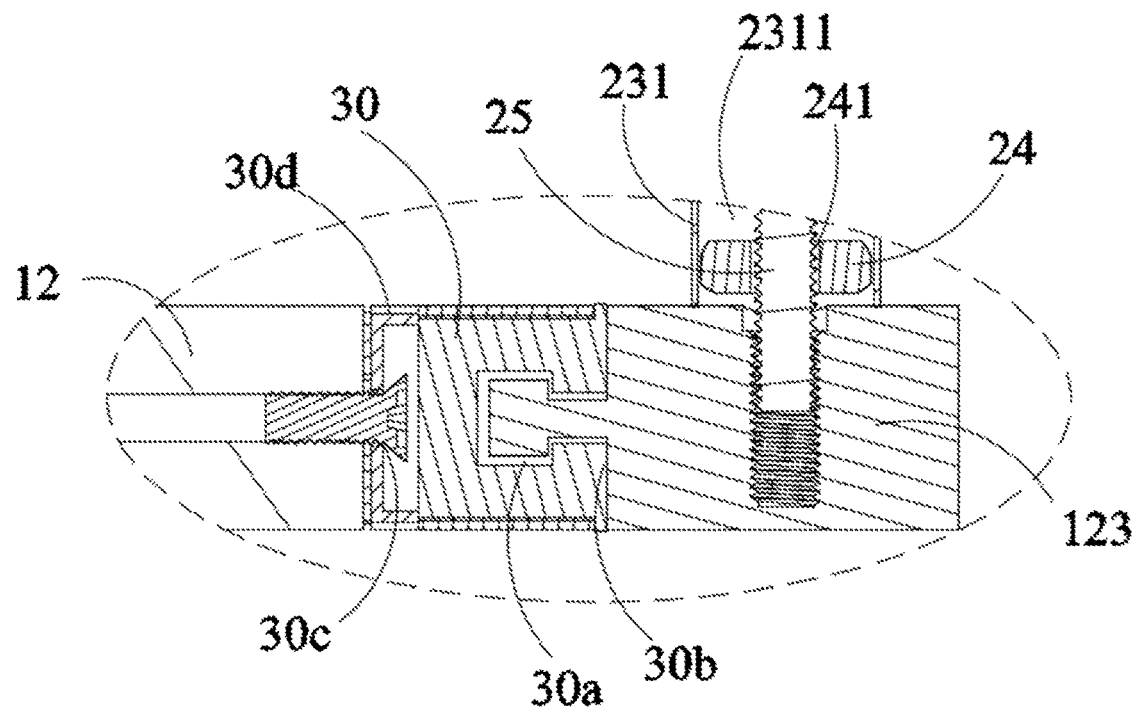
FIG. 10 is an enlarged view of the portion C shown in FIG. 7.
Figure 11:
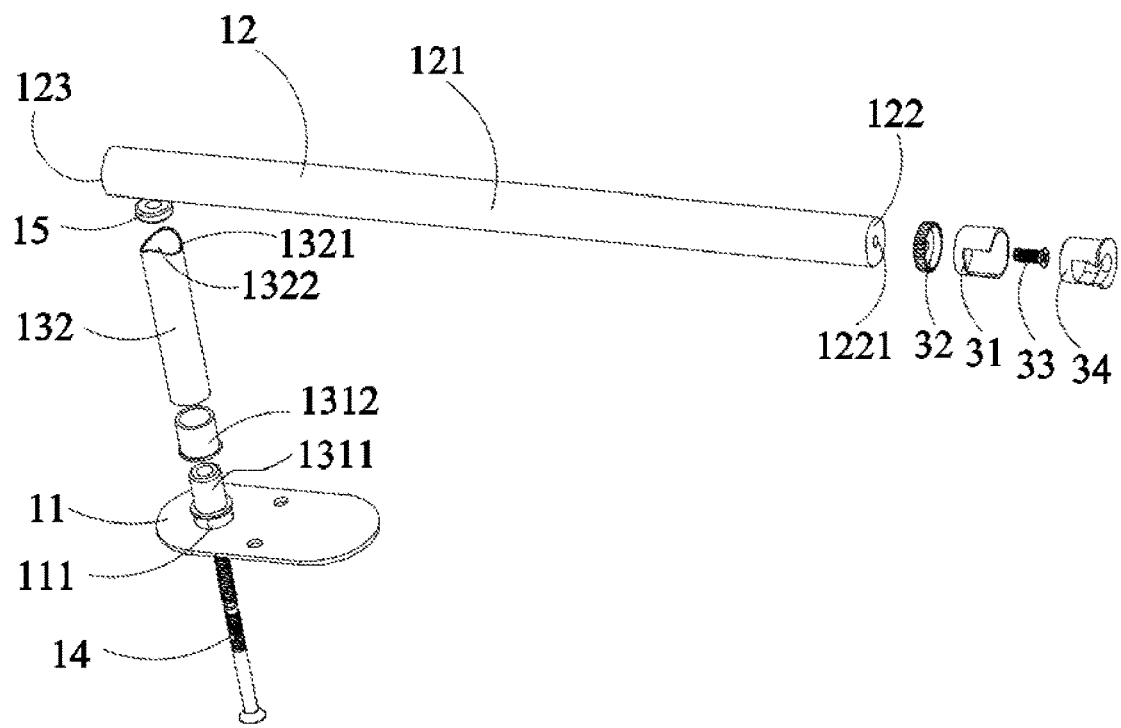
FIG. 11 is an explosive view of a part of the paper towel holder according to the first embodiment of the present disclosure.

As shown in FIG. 7 and FIG. 10, the first connection assembly 30 defines a snapping slot 30a, and the second connection assembly 40 is defines an engaging portion 41. When the paper towel holder is in a first usage state, for example when the to-be-hung object is sleeving the first support member 12, the first support member 12 is rotated with respect to the first mounting base 11 to move to approach the second connection assembly 40, and the engaging portion 41 is received in the snapping slot 30a. When the paper towel holder is in a second usage state, for example when the to-be-hung object is taken out of the first support member 12, the first support member 12 is rotated with respect to the first mounting base 11 to move away from the second connection assembly 40, and the engaging portion 41 is detached from the snapping slot 30a.

A circumferential wall of the first connection assembly 30 is arranged with a gear-shaped contact portion 30d, and the gear-shaped contact portion 30d may be contacted by the user. The gear-shaped contact portion 30d is disposed at an end of the first connection assembly 30 and rotates as the first connection assembly 30 is rotating, and at the same time, when the user contacts the gear-shaped contact portion 30d, the first connection assembly 30 is triggered to rotate. In this way, a sensation of the user touching the first connection assembly 30 may be improved by the gear-shaped contact portion 30d, enabling first connection assembly 30 to rotate easily.

Specifically, as shown in FIG. 11 to FIG. 14, the first connection assembly 30 includes a first connection base 31, a knob 32, a third threaded member 33, and a second connection base 34. The second connection base 34 is connected to the first connection base 31. The knob 32 is connected to the first connection base 31. The third threaded member 33 is disposed at a side of the first connection base 31 and extends through the knob 32.

The first connection base 31 is configured to support the knob 32, the third threaded member 33, and the second connection base 34. The first connection base 31 defines a receiving hole 311 and a first notch 312. The receiving hole 311 is formed by an end of the first connection base 31 extending in an axial direction. The first notch 312 is formed by the circumferential wall of the first connection base 31 extending in a radial direction. The receiving hole 311 is communicated with the first notch 312. The receiving hole 311 is configured to receive the second connection base 34. In some embodiments, the receiving hole 311 is cylindrical. The other end face of the first connection base 31 defines a first rotation hole 30c. The third threaded member 33 extends through the first rotation hole 30c and the threaded hole 1221 of the first support member 12 to connect with the first connection assembly 30 to the first support member 12.

The second connection base 34 is received in the receiving hole 311 of the first connection base 31 and is disposed on a side of the first connection base 31 away from the knob 32. The second connection base 34 includes a base body 341 and a third flange 342. The third flange 342 is arranged on a circumferential wall of the base body 341 and projects outwardly.

In some embodiments, the base body 341 is interference fit with the receiving hole 311. Therefore, the second connection base 34 is fixedly connected to the first connection base 31, and the first notch 312 is aligned with the snapping slot 30a. In this case, when the first connection base 31 is rotating, the second connection base 32 rotates accordingly. When the first notch 312 is on a rotation plane of the first support member 12, the engaging portion 41 may be disengaged from the snapping slot 30a, and the object may be hung on or taken out of the first support member 12. When the first notch 312 deviates from the rotation plane of the first support member 12, the engaging portion 41 is blocked by the second connection base 34 and cannot be disengaged from the snapping slot 30a, such that the to-be-hung object is maintained on the first support member 12.

In some embodiments, the base body 341 may be in clearance fit with the receiving hole 311. The first connection base 31 may be rotated relative to the second connection base 34. In this case, the snapping slot 30a is disposed on the rotation plane of the first support member 12, and the first connection base 31 may rotate. When the first notch 312 is aligned with the snapping slot 30a, and when the first support member 12 is rotating, the engaging portion 41 may be disengaged from the snapping slot 30a, and the object may be hung on or taken out of the first support member 12. When the first notch 312 is misaligned with the snapping slot 30a, the engaging portion 41 is blocked by the second connection base 34 and cannot be disengaged from the snapping slot 30a, and the to-be-hung object is maintained on the first support member 12.

The snapping slot 30a is defined in the base body 341 and is located corresponding to the first notch 312. The snapping slot 30a is communicated with the first notch 312. The second connection assembly 40 may extend through the notch 312 to be received in or detached away from the snapping slot 30a. In this way, the first connection assembly 30 and the second connection assembly 40 may be snapped with each other or detached away from each other. In some embodiments, the snapping slot 30a may be step-shaped. The first connection base 31 is made of metal, and the second connection base 34 is made of plastic.

The snapping slot 30a is formed by the end face of the flange 342 extending axially, and the snapping slot 30a allows an opening 30b to be defined in a side wall of the first connection assembly 30. In some embodiments, the snapping slot 30a is a stepped slot, and the engaging portion 41 is stepped. The engaging portion 41 is received in the snapping slot 30a through the opening 30b in the circumferential side wall of the first connection assembly 30.

An end of the first connection base 31 is connected to the knob 32, and the third threaded member 33 extends through the first connection base 31. The third threaded member 33 extends through the first connection base 31 and the knob 32 and is threaded into the threaded hole 1221 of the first support member 12. The knob 32 defines a via 321 and a recess 322. A threaded portion of the third threaded member 33 extends through the via 321. The recess 321 is communicated through the via 321 and receives a threaded end portion of the third threaded member 33. In this case, the threaded end portion of the third threaded member 33 is disposed between the knob 32 and the first connection base 31 and is received.

Since a gap is defined between an inner wall of the knob 32 defining the via 321 and an outer wall of the threaded portion of the third threaded member 33, such that the knob 32 to be rotated with respect to the first support member 12, and the first connection base 31 connected to the knob 32 is rotated with respect to the first support member 12. In this way, the second connection base 34 is rotated, allowing an orientation of the snapping slot 30a to be adjusted, and therefore, the connection status between the first connection assembly 30 and the second connection assembly 40 may be adjusted. An outer surface of the knob 32 is arranged with the gear-shaped contact portion 30d, such that a sensation and a friction of the knob 32 may be improved by the gear-shaped contact portion 30d.

In some embodiments, the first connection base 31 and the knob 32 are configured as a one-piece structure. Alternatively, the first connection base 31 and the knob 32 are two separated elements welded to each other to reduce a cost of processing the first connection assembly 30. In some embodiments, the first connection base 31 and the knob 32 are both metal structures.

Figure 15:
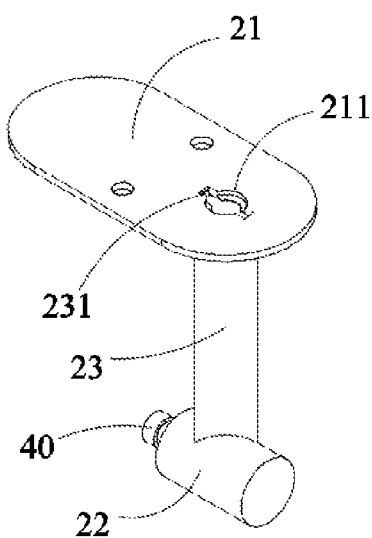
FIG. 15 is a perspective view of the assembled second support assembly of the paper towel holder according to the first embodiment of the present disclosure.
Figure 16:
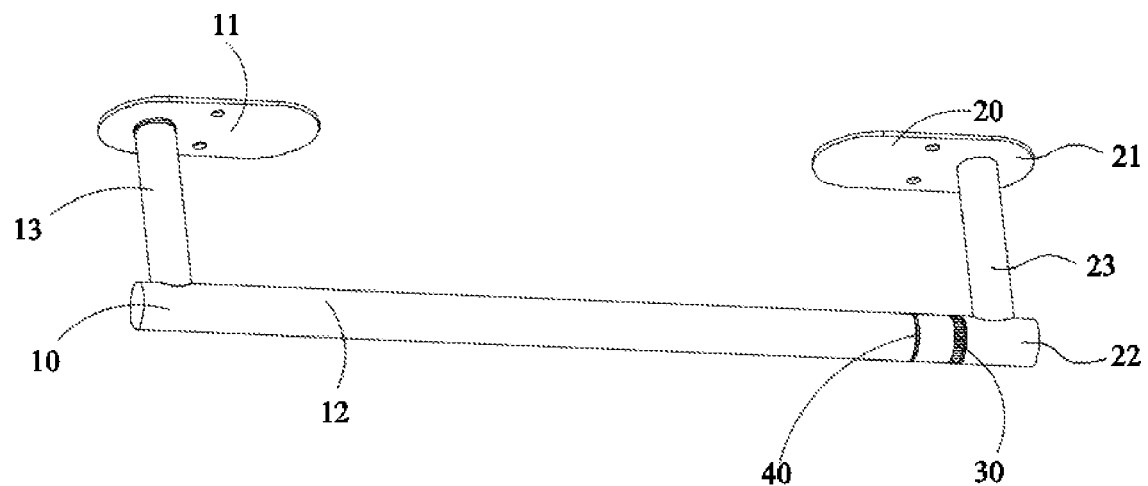
FIG. 16 is a perspective view of the assembled paper towel holder according to a second embodiment of the present disclosure.
Figure 17:
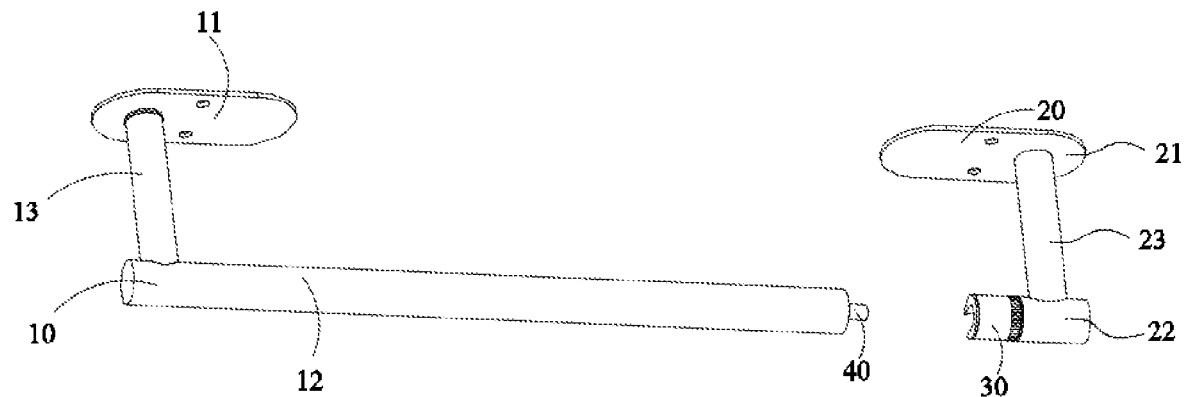
FIG. 17 is a perspective view of the assembled paper towel holder, being viewed from another viewing angle, according to a second embodiment of the present disclosure.
Figure 18:
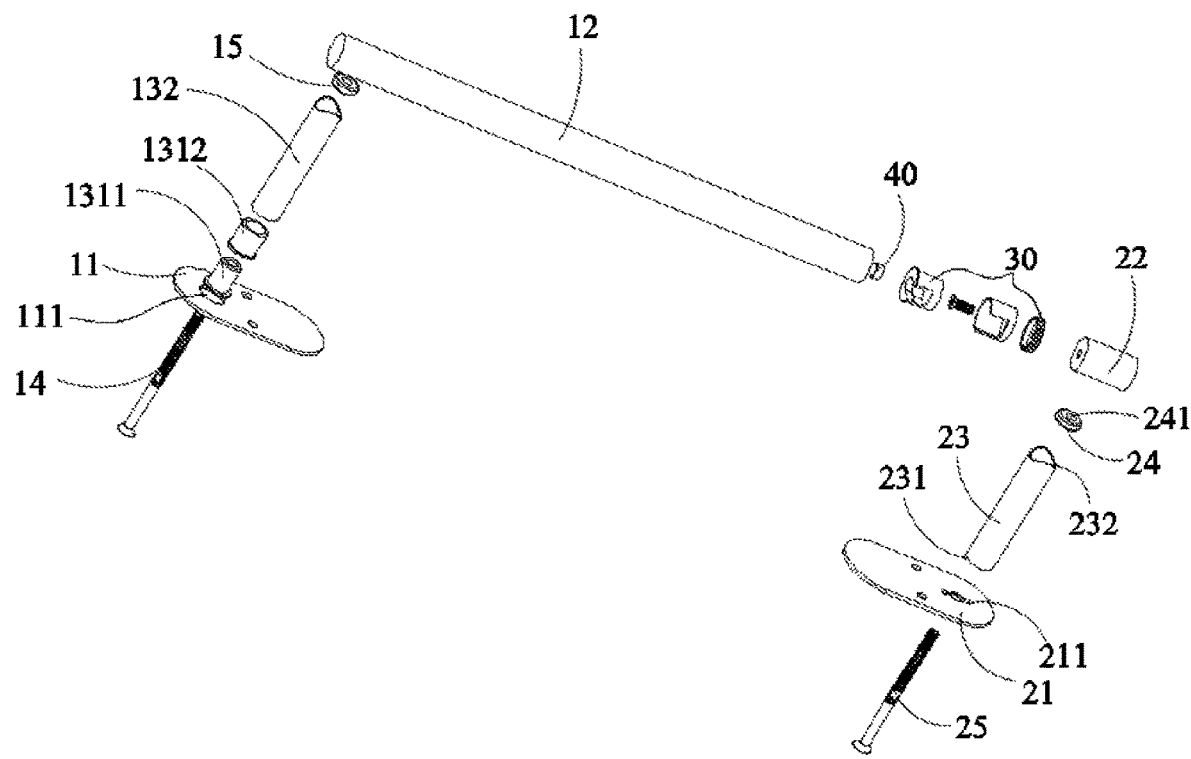
FIG. 18 is an explosive view of the paper towel holder according to the second embodiment of the present disclosure.
Figure 19:
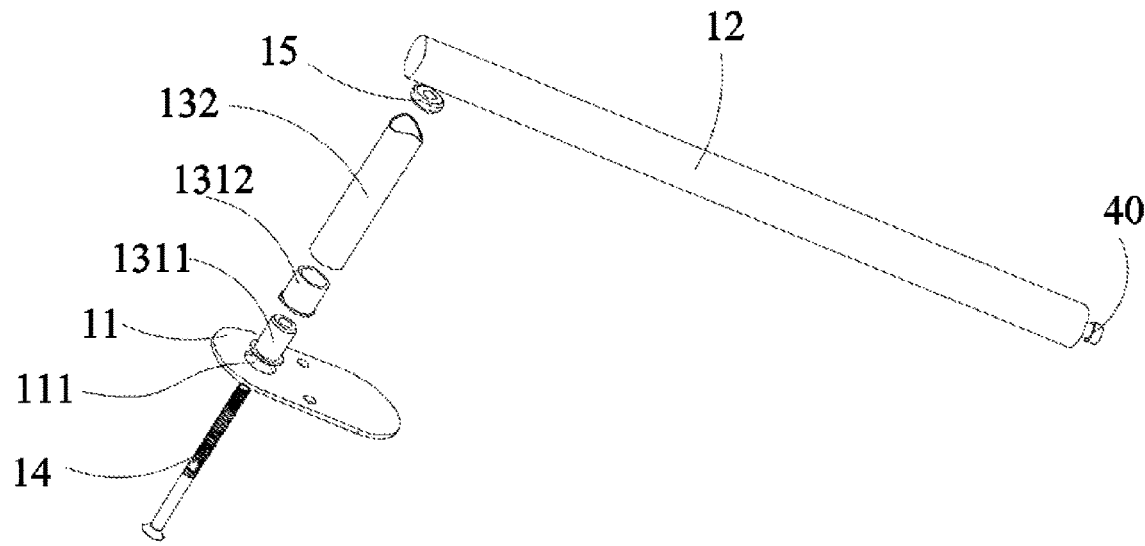
FIG. 19 is an explosive view of a part of the paper towel holder according to the second embodiment of the present disclosure.
Figure 20:
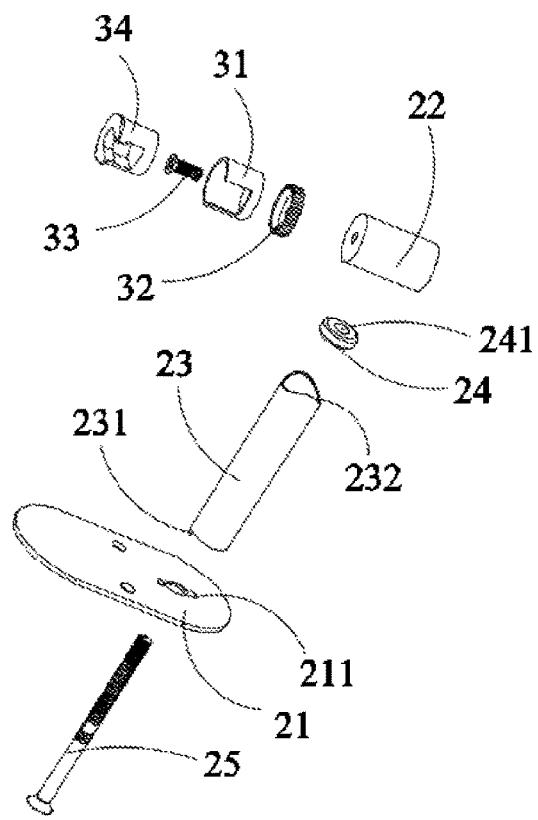
FIG. 20 is another explosive view of a part of the paper towel holder according to the second embodiment of the present disclosure.
Figure 21:
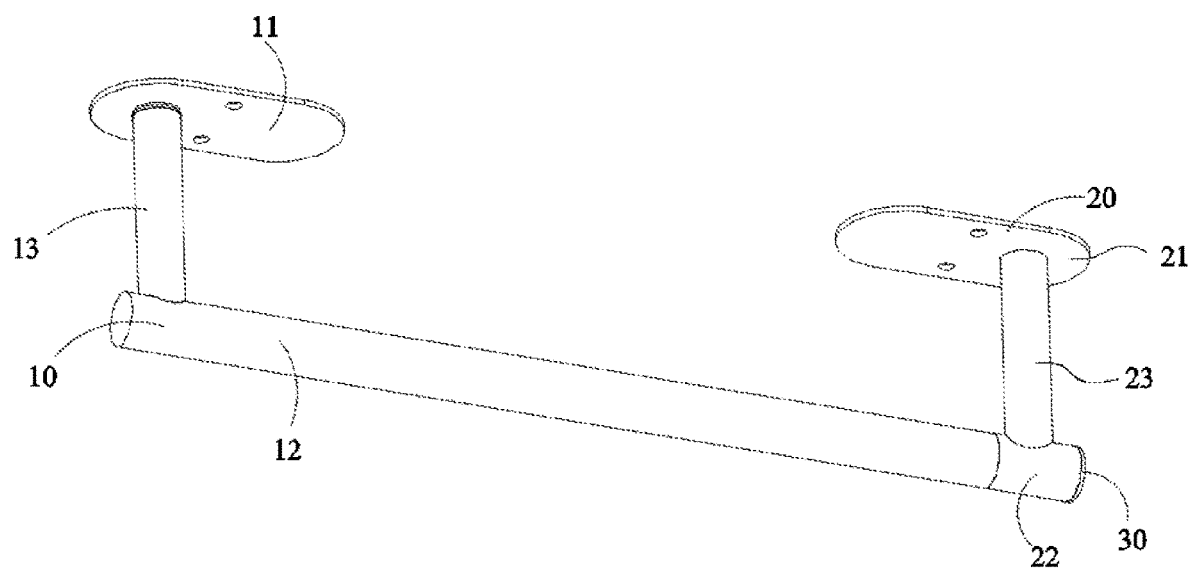
FIG. 21 is a perspective view of the assembled paper towel holder according to a third embodiment of the present disclosure.
Figure 22:
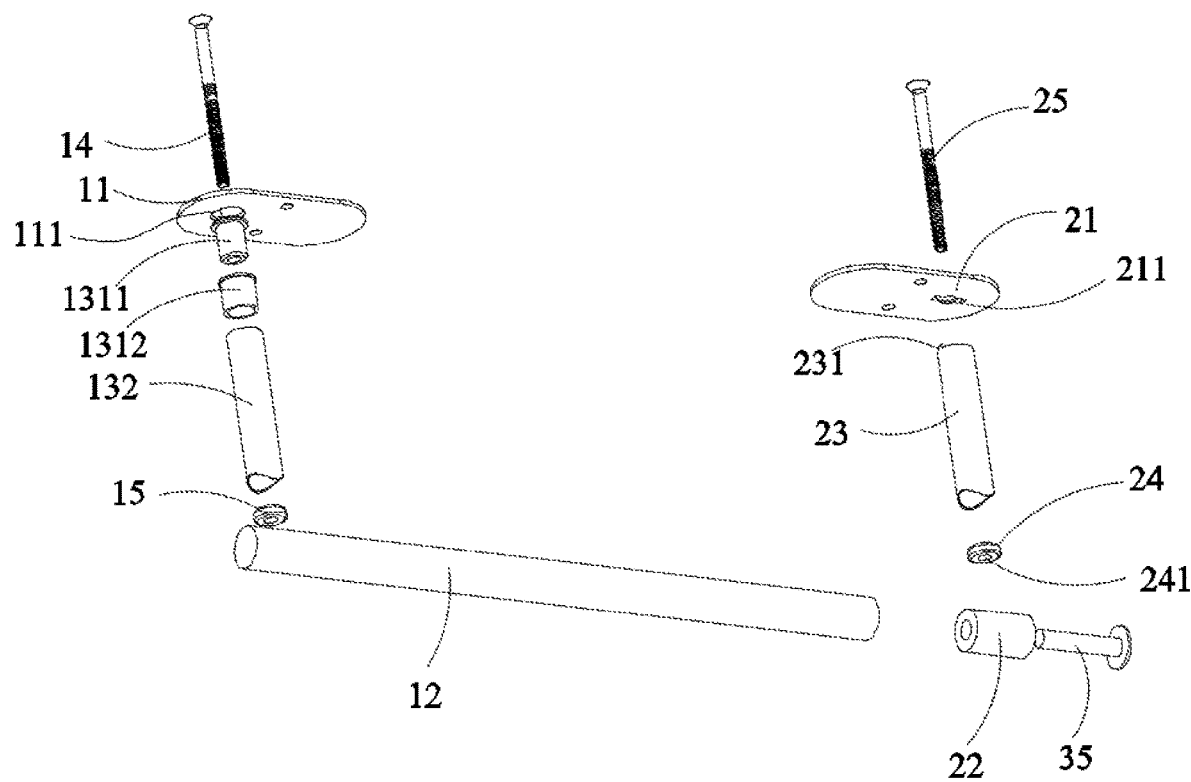
FIG. 22 is an explosive view of the paper towel holder according to the third embodiment of the present disclosure.
Figure 23:
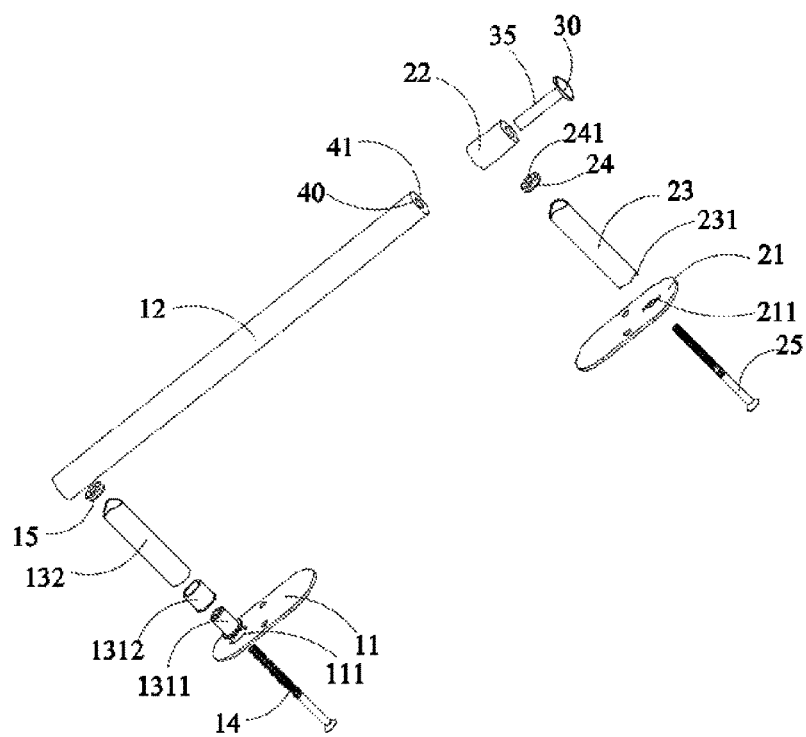
FIG. 23 is a perspective view of the assembled paper towel holder, being viewed from another viewing angle, according to the third embodiment of the present disclosure.
Figure 24:
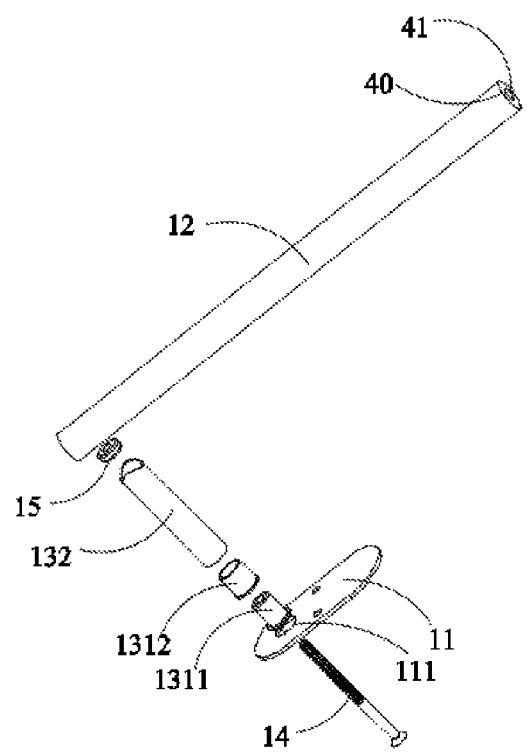
FIG. 24 is an explosive view of a part of the paper towel holder according to the third embodiment of the present disclosure.
Figure 25:
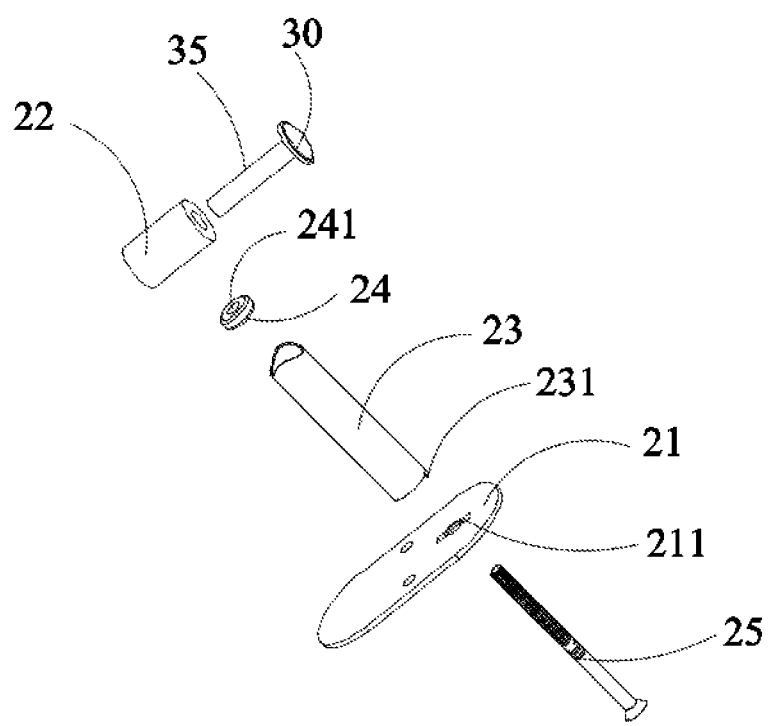
FIG. 25 is another explosive view of a part of the paper towel holder according to the third embodiment of the present disclosure.

In some embodiments, the knob 32 may be omitted. In this case, while the frame is in use, the first connection base 13 may be rotated directly. In some embodiments, the first connection base 31 may further be omitted. In this case, the second connection base 34 is rotatably connected to the first support member 12. As shown in FIG. 15 and FIG. 16, in addition, the second connection assembly 40 is connected to the second support member 22 and is stationary relative to the second support member 22. The second connection assembly 40 extends from an end of the second support member 22 outwardly. The second connection assembly 40 may be a stepped shaft and is inserted in the snapping slot 30a.

Second Embodiment

As shown in FIG. 17 to FIG. 21, compared to the first embodiment, positions of the first connection assembly 30 and the second connection assembly 40 are adjusted in the present embodiment. In the present embodiment, the first connection assembly 30 is arranged on the second support member 22, and the second connection assembly 40 is arranged on the first support member 12. The first connection assembly 30 defines the snapping slot 30a. The second connection assembly 40 is arranged with the engaging portion 41. The engaging portion 41 is snapped with the snapping slot 30a.

The second connection assembly 40 is arranged on the first support member 12. The second connection assembly 40 rotates as the first support member 12 rotates and gradually approaches or moves away from the first connection assembly 30. Since the first connection assembly 30 is arranged on the second support member 22 and is maintained at rest, the snap connection between the snapping slot 30a and the engaging portion 41 may be achieved easily.

Third Embodiment

As shown in FIG. 22 to FIG. 25, compared to the first embodiment, the first connection assembly 30 in the present embodiment is arranged with an insertion shaft 35. The insertion shaft 35 extends through the first connection assembly 30 and may further be inserted into or detached from the snapping slot 41 of the second connection assembly 40. In the present embodiment, the insertion shaft 35 may be extendably and retractably connected to the first connection assembly 30 and may be extended and retracted along the axis of the first connection assembly 30 to be inserted into or detached from the snapping slot 41 of the second connection assembly 40. In this way, the first connection assembly 30 is connected to the insertion slot 41 through the insertion shaft 35, and therefore, the first connection assembly 30 is connected to the second connection assembly 40.

The present disclosure provides a paper towel holder 100, one of the first support member 12 and the second support member 22 is connected with the first connection assembly 30, and the other one of the first support member 12 and the second support member 22 is connected with the second connection assembly 40. When the first support member 12 and the second support member 22 are approaching each other, the first connection assembly 30 and the second connection assembly 40 are detachably connected with each other. The first support member 12 is configured to support the to-be-hung object. When the first connection assembly 30 is detached from the second connection assembly 40, the first support member 12 is disposed at the outside of the second support member 22. The user may place the to-be-hung object to sleeve the first support member 12, such that the first support member 12 may support the object easily, and the object may be taken out of the first support member 12. In addition, the first support member 12 rotates with respect to the first mounting base 11 and gradually approaches the second support member to allow the first connection assembly 30 to be connected to the second connection assembly 40. The connection between the first connection assembly 30 and the second connection assembly 40 may prevent the object from being detached away from the paper towel holder 100, ensuring the paper towel holder 100 to hang the object stably. Further, the object may be taken out of the paper towel holder 100 by switching the connection status between the first connection assembly 30 and the second connection assembly 40.

In the above-mentioned embodiments, the description of each embodiment has its own focus, and any feature that is not described in detail in one embodiment may be referred to the relevant descriptions in other embodiments.

In the description of the present disclosure, the terms "first" and "second" are used for descriptive purposes only and shall not be understood as indicating or implying relative importance or implicitly specifying the number of technical features. Therefore, the feature qualified with "first" and "second" may explicitly or implicitly include one or more features.

The above examples are only used to help understand the method and the essential idea of the present disclosure. Further, any ordinary skilled person in the art may perform changes in the specific implementation and the scope of the present disclosure based on the concept of the present disclosure. The content of the present disclosure shall not be interpreted as a limitation of the present disclosure.

What is claimed is:

1. A paper towel holder, comprising:
a first support assembly, comprising a first mounting base and a first support member, wherein the first support member is rotatably connected to the first mounting base and is configured to support a to-be-hung object;
a second support assembly, disposed on a side of the first support assembly, wherein the second support assembly comprises a second mounting base and a second support member, and the second support member is connected to the second mounting base;
a first connection assembly; and
a second connection assembly;
wherein one of the first support member and the second support member is rotatably connected to the first connection assembly, and the other one of the first support member and the second support member is connected to the second connection assembly; the first connection assembly is detachably connected to the second connection assembly;
the first connection assembly comprises a connection base and defines a snapping slot, the connection base defines a notch; the second connection assembly is arranged with an engaging portion;
the first connection base is configured to rotate to reach an unlock state, in the unlock state, the snapping slot is aligned with the notch, and the engaging portion is capable of being received in or taken out of the snapping slot; the first connection base is further configured to rotate to reach a lock state, in the lock state, the snapping slot is misaligned with the notch, and the engaging portion is unable to be received in or taken out of the snapping slot;
when the engaging portion is received in the snapping slot, the first connection assembly is connected to the second connection assembly to hold the to-be-hung object;
when the engaging portion is taken out of the snapping slot, the first connection assembly is detached from the second connection assembly to release the to-be-hung object.

2. The paper towel holder according to claim 1, wherein the first support assembly further comprises a first connection arm, an end of the first connection arm is rotatably connected to the first mounting base, and the other end of the first connection arm is connected to the first support member.

3. The paper towel holder according to claim 2, wherein the first connection arm comprises a first rotation shaft and a second rotation shaft, the first rotation shaft is fixedly mounted on the first mounting base; the second rotation shaft rotatably sleeves the first rotation shaft and is disposed between the first mounting base and the first support member, and the second rotation shaft is connected to the first support member.

4. The paper towel holder according to claim 3, wherein an end of the second rotation shaft facing towards the first support member is arranged with a first arc portion, the first support member is a cylindrical rod, and the first support member is embedded in the first arc portion.

5. The paper towel holder according to claim 1, wherein when the first connection assembly is approaching the second connection assembly, the engaging portion is configured to be snapped in the snapping slot; and when the first connection assembly is moving away from the second connection assembly, the engaging portion is configured to be disengaged from the snapping slot.

6. The paper towel holder according to claim 5, wherein the snapping slot is formed by an end face of the first connection assembly extending in an axial direction, and an opening is defined in a side wall of the first connection assembly.

7. The paper towel holder according to claim 6, wherein the first connection assembly further comprises a second connection base, the first connection base further defines a through hole, the second connection base is received inside the first connection base, the snapping slot is defined in the second connection base, the first notch corresponds to the opening of the snapping slot defined in the side wall.

8. The paper towel holder according to claim 7, wherein the first connection base is rotatable with respect to the second connection base.

9. The paper towel holder according to claim 7, wherein the first connection base is fixedly connected to the second connection base.

10. The paper towel holder according to claim 6, wherein the first connection assembly further comprises a knob, the knob is fixedly connected to the first connection base; and the first connection base is configured to rotate, driven by the knob being rotating.

11. The paper towel holder according to claim 10, wherein a circumferential wall of the knob is arranged with a gear-shaped contact face.

12. The paper towel holder according to claim 1, wherein the second support assembly further comprises a second connection arm, the second connection arm is disposed between the second mounting base and the second support member, an end of the second connection arm is connected to the second mounting base, and the other end of the second connection arm is connected to the second support member.

13. The paper towel holder according to claim 1, wherein a length of the first support member is greater than a length of the second support member.

14. The paper towel holder according to claim 1, wherein the first connection assembly is arranged on the second support member, the second connection assembly is arranged on the first support member, the first connection member defines a snapping slot, the second connection member is arranged with a snap sleeve, the snap sleeve is snapped to the snapping slot.

15. The paper towel holder according to claim 1, wherein the first connection assembly is arranged with an insertion shaft, the insertion shaft extends through the first connection assembly and is capable of being inserted into or being detached away from an insertion slot in the second connection assembly in an axial direction.

16. The paper towel holder according to claim 15, wherein the insertion shaft is retractably connected to the first connection assembly and is configured to extend and retract along an axis of the first connection assembly to be inserted into or to be disengaged from the insertion slot of the second connection assembly.

17. A paper towel holder, comprising:
a first support assembly, comprising a first mounting base and a first support member, wherein the first support member is rotatably connected to the first mounting base and is configured to support a to-be-hung object;
a second support assembly, disposed on a side of the first support assembly, wherein the second support assembly comprises a second mounting base and a second support member, and the second support member is connected to the second mounting base;
a first connection assembly; and
a second connection assembly;
wherein one of the first support member and the second support member is rotatably connected to the first connection assembly, and the other one of the first support member and the second support member is connected to the second connection assembly; the first connection assembly is detachably connected to the second connection assembly;
a first state, the first connection assembly is connected to the second connection assembly to hold the to-be-hung object; in a second state, the first connection assembly is detached from the second connection assembly to release the to-be-hung object;
wherein, the first support assembly further comprises a first connection arm rotatably connected to the first mounting base, the first connection arm comprises a first rotation shaft;
wherein the first rotation shaft comprises a first shaft sleeve and a second shaft sleeve, the first shaft sleeve is fixedly connected to the first mounting base, the second shaft sleeve sleeves the first shaft sleeve, and the second rotation shaft sleeves the second shaft sleeve.

18. The paper towel holder according to claim 17, wherein the first support member defines a threaded hole;
the first support assembly further comprises a first threaded member, the first threaded member extends through the first rotation shaft and the second rotation shaft, a nut end of the first threaded member contacts an end portion of the first rotation shaft, and a threaded end of the first threaded member is threadly connected the threaded hole.

19. The paper towel holder according to claim 18, wherein the second rotation shaft defines an inner cavity;
a first limiting member is arranged inside the second rotation shaft, the first limiting member is in clearance fit with the inner cavity, the first threaded member extends through the first limiting member.

20. A paper towel holder, comprising:
a first support assembly, comprising a first mounting base and a first support member, wherein the first support member is rotatably connected to the first mounting base and is configured to support a to-be-hung object;

a second support assembly, disposed on a side of the first support assembly, wherein the second support assembly comprises a second mounting base and a second support member, and the second support member is connected to the second mounting base;

a first connection assembly; and a second connection assembly;

wherein one of the first support member and the second support member is rotatably connected to the first connection assembly, and the other one of the first support member and the second support member is connected to the second connection assembly; the first connection assembly is detachably connected to the second connection assembly;

a first state, the first connection assembly is connected to the second connection assembly to hold the to-be-hung object; in a second state, the first connection assembly is detached from the second connection assembly to release the to-be-hung object;

wherein the second support assembly further comprises a second connection arm, the second connection arm is disposed between the second mounting base and the second support member, an end of the second connection arm is connected to the second mounting base, and the other end of the second connection arm is connected to the second support member;

wherein the second mounting base defines a positioning hole, an end of the second connection arm away from the second support member is arranged with a protruding tab, and the protruding tab is inserted in the positioning hole.

\* \* \* \* \*